(12) United States Patent
Tkac

(10) Patent No.: US 8,820,071 B2
(45) Date of Patent: *Sep. 2, 2014

(54) INTEGRATED COMPRESSOR HOUSING AND INLET

(75) Inventor: Ronald M. Tkac, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 435 days.

This patent is subject to a terminal disclaimer.

(21) Appl. No.: 13/186,982

(22) Filed: Jul. 20, 2011

(65) Prior Publication Data

US 2013/0019592 A1 Jan. 24, 2013

(51) Int. Cl.
*F02B 33/44* (2006.01)
*F04D 29/44* (2006.01)
*F04D 29/54* (2006.01)
*F01D 25/24* (2006.01)
*F03B 11/02* (2006.01)

(52) U.S. Cl.
USPC ............ 60/605.1; 60/611; 415/200; 415/206; 415/183; 415/58.4

(58) Field of Classification Search
USPC ......... 60/605.1, 611; 415/200, 204, 206, 119, 415/58.4, 201.1
See application file for complete search history.

(56) References Cited

U.S. PATENT DOCUMENTS

| | | | | |
|---|---|---|---|---|
| 3,071,313 A | * | 1/1963 | Weisel ........................ | 415/204 |
| 3,741,676 A | * | 6/1973 | Silvern et al. ............. | 415/122.1 |
| 3,741,677 A | * | 6/1973 | Silvern et al. ............. | 415/58.4 |
| 3,976,390 A | * | 8/1976 | Silvern et al. ............. | 415/58.4 |
| 4,182,595 A | * | 1/1980 | Burney et al. ............. | 415/206 |
| 5,549,449 A | * | 8/1996 | McInerney et al. ......... | 417/406 |
| 6,036,432 A | * | 3/2000 | Sishtla et al. ............. | 415/119 |
| 6,517,309 B1 | * | 2/2003 | Zaher ......................... | 415/58.4 |
| 6,672,856 B1 | * | 1/2004 | Khalifa et al. ............. | 418/201.1 |
| 7,721,542 B2 | * | 5/2010 | Chen .......................... | 60/605.2 |
| 7,874,789 B2 | * | 1/2011 | Sirakov et al. ............. | 415/58.4 |
| 8,177,498 B2 | * | 5/2012 | Hermann et al. ........... | 415/200 |
| 8,251,650 B2 | * | 8/2012 | Ibaraki et al. .............. | 415/200 |
| 8,272,832 B2 | * | 9/2012 | Yin ............................ | 415/206 |
| 8,286,428 B2 | * | 10/2012 | Capon et al. ............... | 60/605.1 |
| 8,388,302 B2 | * | 3/2013 | Anderson et al. .......... | 415/206 |
| 2007/0283698 A1 | * | 12/2007 | Chen .......................... | 60/605.1 |
| 2008/0127644 A1 | * | 6/2008 | Codan et al. ................ | 60/600 |

(Continued)

FOREIGN PATENT DOCUMENTS

| | | | |
|---|---|---|---|
| CN | 201210242346 | 7/2012 | |
| FR | 2927364 A1 | * 8/2009 | ............ F02D 23/00 |
| JP | 2006336486 A | * 12/2006 | ............ F04D 23/00 |

OTHER PUBLICATIONS

Office Action regarding related Application No. CN 201210252400.2; dated Mar. 5, 2014; 8 pgs.

*Primary Examiner* — Thai Ba Trieu
(74) *Attorney, Agent, or Firm* — Cantor Colburn LLP

(57) ABSTRACT

In one exemplary embodiment of the present invention, a compressor housing for a forced induction system of an internal combustion engine is provided. The compressor housing includes a compressor inlet passage in fluid communication with a compressor volute configured to house a compressor wheel, the compressor inlet passage comprising a wall that is shared with the compressor volute. The compressor also includes a compressor outlet in fluid communication with the compressor volute, the compressor outlet being configured to direct a compressed gas to an intake manifold of the internal combustion engine.

16 Claims, 4 Drawing Sheets

(56) References Cited

U.S. PATENT DOCUMENTS

| | | | |
|---|---|---|---|
| 2009/0139228 A1* | 6/2009 | Talmon-Gros et al. | 60/605.1 |
| 2009/0263234 A1* | 10/2009 | Yin | 415/58.4 |
| 2009/0290979 A1* | 11/2009 | Ibaraki et al. | 415/200 |
| 2010/0005799 A1* | 1/2010 | Nikpour | 60/605.1 |
| 2010/0061843 A1* | 3/2010 | Anderson et al. | 415/183 |
| 2012/0186247 A1* | 7/2012 | Marques et al. | 60/605.1 |

\* cited by examiner

INTEGRATED COMPRESSOR HOUSING AND INLET

FIELD OF THE INVENTION

The subject invention relates to turbochargers, and air induction systems, and, more particularly, to a turbocharger housing having an integrated compressor inlet passage.

BACKGROUND

The use of forced-induction, particularly including turbochargers, in modern internal combustion engines, including both gasoline and diesel engines, is frequently employed to increase the engine intake mass airflow and the power output of the engine. It is desirable to have turbocharged engines efficiently use the energy available in the exhaust system in order to improve overall engine efficiency and fuel economy. Conduits directing a supply of air to a compressor in the turbocharger are one of many factors that affect turbocharger efficiency. Specifically, angles at intersections of ducts, passages or conduits in a flow path of a turbocharger affect a flow velocity into the compressor wheel and/or out of a turbine volute.

Further, as engines become more complex, the packaging of various turbocharger components can make design of the air flow path, turbocharger and engine system challenging. For example, ducts or conduits directing air into the turbocharger may interfere with other engine components, causing packaging constraints. Accordingly, improved packaging of the turbocharger and air induction system will enable the use of turbochargers in a variety of applications. In addition improved packaging and design of the turbocharger and air induction system may reduce the complexity and number of components, thereby leading to improved cost, efficiency and performance.

SUMMARY OF THE INVENTION

In one exemplary embodiment of the invention, a compressor housing for a forced induction system of an internal combustion engine is provided. The compressor housing includes a compressor inlet passage in fluid communication with a compressor volute configured to house a compressor wheel, the compressor inlet passage comprising a wall that is shared with the compressor volute. The compressor also includes a compressor outlet in fluid communication with the compressor volute, the compressor outlet being configured to direct a compressed gas to an intake manifold of the internal combustion engine.

In another exemplary embodiment of the invention, a method for forced air induction of an internal combustion engine is provided. The method includes directing an air flow into a compressor inlet passage integrated in a compressor housing, wherein the compressor inlet passage creates an air flow component that is substantially tangential with respect to an axis of a compressor wheel disposed in a compressor volute of the compressor housing and directing a compressed air flow from the compressor volute to an intake manifold of the internal combustion engine.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
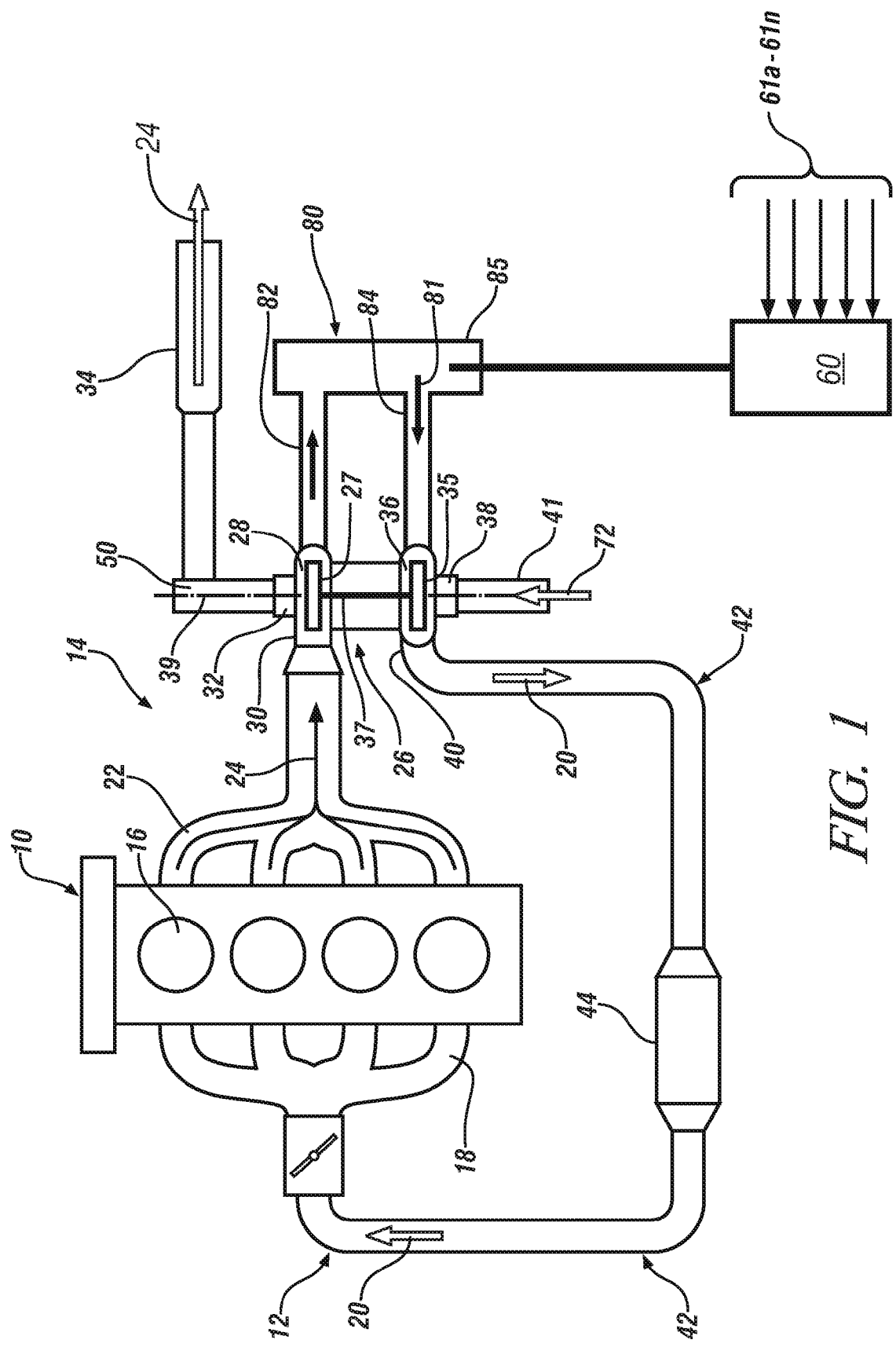
FIG. 1 is an exemplary diagram of an internal combustion engine that includes a turbocharger.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 illustrates an internal combustion engine 10, in this case an in-line four cylinder engine, including an intake system 12 and an exhaust system 14. The internal combustion engine 10 includes a plurality of cylinders 16 into which a combination of combustion air and fuel are introduced. The combustion air/fuel mixture is combusted in the cylinders 16 resulting in reciprocation of pistons (not shown) therein. The reciprocation of the pistons rotates a crankshaft (not shown) to deliver motive power to a vehicle powertrain (not shown) or to a generator or other stationary recipient of such power (not shown) in the case of a stationary application of the internal combustion engine 10. The internal combustion engine 10 includes an intake manifold 18 in fluid communication with the cylinders 16, where the intake manifold 18 receives a compressed intake charge 20 from the intake system 12 and delivers the charge to the plurality of cylinders 16. The exhaust system 14 includes an exhaust manifold 22, also in fluid communication with the cylinders 16, which is configured to remove combusted constituents of the combustion air and fuel (i.e. exhaust gas 24) and to deliver it to an exhaust driven turbocharger 26 located in fluid communication therewith. The turbocharger 26 includes an exhaust gas turbine wheel 27 that is housed within a turbine housing 28. The turbine housing 28 includes an inlet 30 and an outlet 32. The outlet 32 is in fluid communication with the remainder of the exhaust system 14 and delivers the exhaust gas 24 to an exhaust gas conduit 34. The exhaust gas conduit 34 may include various exhaust after treatment devices, such as a catalytic converter 50. As depicted, the catalytic converter 50 is close coupled to the outlet 32 of the turbocharger 26 and is configured to treat various regulated constituents of the exhaust gas 24 prior to its release to the atmosphere. In embodiments, the turbocharger 26 may be any suitable forced air induction apparatus, such as a twin scroll turbocharger or a twin turbocharger The turbocharger 26 also includes an intake charge compressor wheel 35 that is housed within a compressor housing 36. The compressor wheel 35 is coupled by a shaft 37 to the turbine wheel 27, wherein the compressor wheel 35, the shaft 37, and the turbine wheel 27 rotate about an axis 39. The compressor housing 36 includes an inlet 38 and an outlet 40. The inlet 38 is a passage that is in fluid communication with an air supply conduit 41, which delivers fresh air 72 to the compressor housing 36. The outlet 40 is in fluid communication with the intake system 12 and delivers the compressed intake charge 20 through an intake charge conduit 42 to the intake manifold 18. The intake charge 20 is distributed by the intake manifold 18 to the cylinders 16 of the internal combustion engine 10 for mixing with fuel and for combustion therein. In an exemplary embodiment, disposed inline between the compressor housing outlet 40 and the intake manifold 18 is a compressed intake charge cooler 44. The compressed intake charge cooler 44 receives the heated (due to compression) compressed intake charge 20 from the intake charge conduit 42 and, following cooling of the compressed intake charge 20 therein, delivers it to the intake manifold 18 through a subsequent portion of the intake charge conduit 42.

Located in fluid communication with the exhaust system 14, and in the exemplary embodiment shown in FIG. 1, is an exhaust gas recirculation ("EGR") system 80. The EGR system 80 includes EGR supply conduit 82, EGR inlet conduit 84, and EGR valve 85. In one embodiment, the EGR supply conduit 82 is in fluid communication with, and coupled to, turbine housing 28. In addition, the EGR inlet conduit 84 is in fluid communication with, and coupled to, compressor housing 36. The EGR supply conduit 82 is configured to divert a portion of the exhaust gas 24 from the turbine housing 28 and to recirculate it to the intake system 12 through the compressor housing 36 of the exhaust driven turbocharger 26. As depicted, the EGR valve 85 is in signal communication with a control module such as an engine controller 60. The EGR valve 85 adjusts the volumetric quantity of received exhaust gas 24 that is diverted, as recirculated exhaust gas ("EGR") 81, to the intake system 12, based on the particular engine operating conditions at any given time. The engine controller 60 collects information regarding the operation of the internal combustion engine 10 from sensors 61a-61n, such as temperature (intake system, exhaust system, engine coolant, ambient, etc.), pressure, exhaust system conditions, driver demand and, as a result, may adjust many engine conditions and operations, including the flow of exhaust gas 24 through the EGR valve 85 to be mixed with fresh air 72 to form the compressed intake charge 20. As a result, the compressed intake charge 20 may comprise a continuously variable combination of fresh air 72 and recirculated exhaust gas 81, depending on the commanded quantity of EGR by the controller 60. As used herein, the term controller refers to an application specific integrated circuit (ASIC), an electronic circuit, a processor (shared, dedicated or group) and memory that executes one or more software or firmware programs, a combinational logic circuit, and/or other suitable components that provide the described functionality.

With continuing reference to the exemplary embodiment of FIG. 1, the compressor inlet 38 is integrated into compressor housing 36. The fresh air 72 flows through air supply conduit 41 toward a volute in the compressor housing 36, wherein the compressor wheel 35 compresses the air. By integrating the compressor inlet 38 and the compressor housing 36 as a single component, the flow path of fresh air 72 is controlled to provide improved and increased air flow into the compressor housing 36. An exemplary compressor inlet 38 provides a tangential component to the flow of fresh air 72, thereby causing a swirling effect as the air flows into the compressor housing 36. Further, the compressor inlet 38 also includes an offset portion to induce swirling of the fresh air 72. The swirling fresh air 72 is configured to swirl in the same rotational direction of compressor wheel 35, thereby improving air intake and efficiency of the turbocharger 26. Further, integration of the compressor inlet 38 and compressor housing 36 reduces the number of parts in the turbocharger 26, thereby reducing cost and simplifying manufacture of the turbocharger 26. Exemplary embodiments of the turbocharger 26 as well as various arrangements thereof are described in detail below with reference to FIGS. 2-4.

Figure 2:
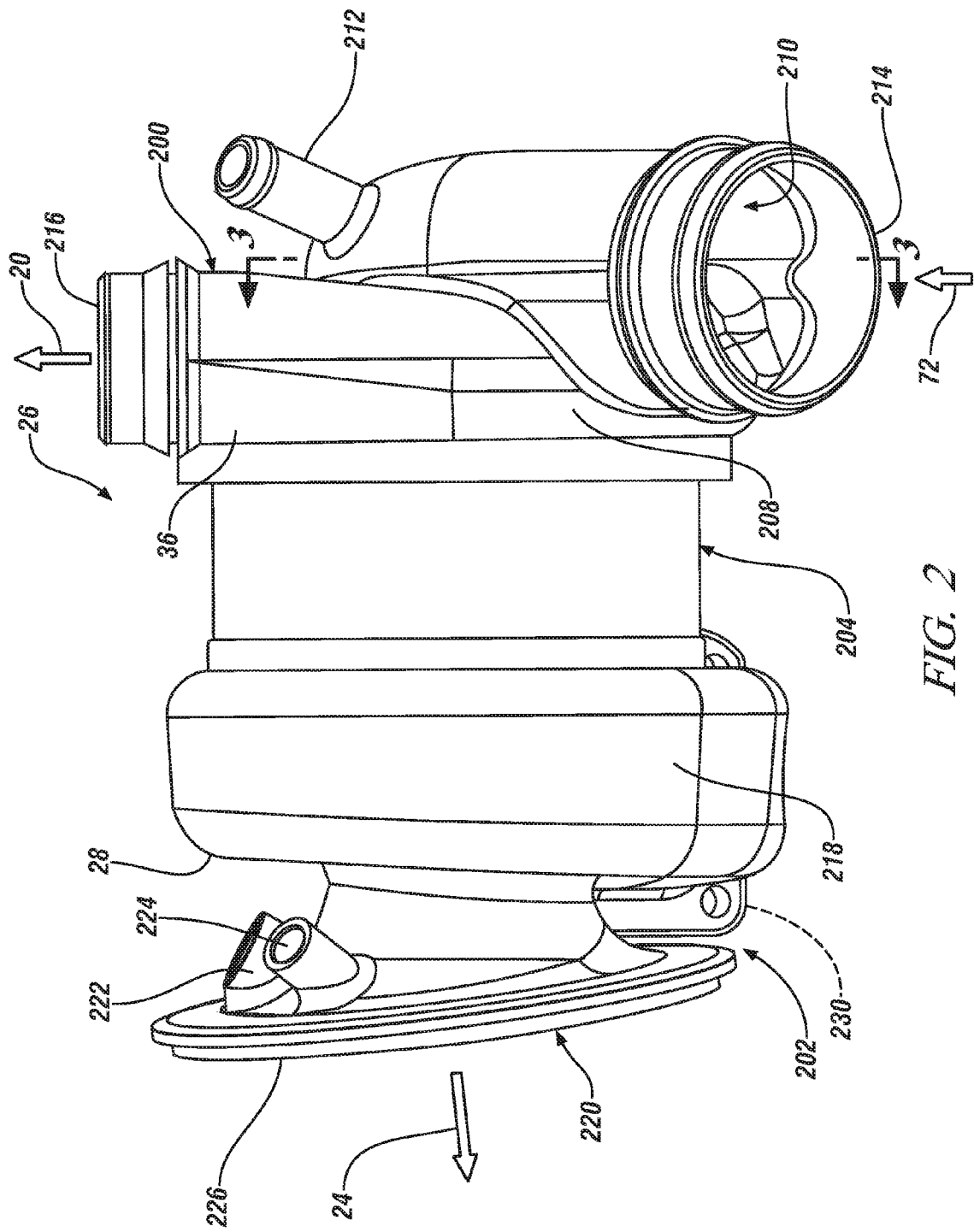
FIG. 2 is a side view of an exemplary turbocharger.

FIG. 2 is a side view of an exemplary turbocharger 26 which includes a compressor portion 200, a turbine portion 202 and a shaft housing 204. The compressor portion 200 includes the compressor housing 36, a compressor volute 208 and a compressor inlet 210. The compressor volute 208 houses compressor wheel 35 (FIG. 1) and receives fresh air 72 via the compressor inlet 210 (also referred to as "compressor inlet passage" or as "compressor inlet duct"). A PCV valve housing 212 may be integrated into the compressor inlet 210 and receives a PCV valve (not shown). The fresh air 72 is directed through an inlet opening 214, wherein the compressor volute 208 receives the fresh air 72 and the compressor wheel 35 compresses the air to form the compressed intake charge 20, which is directed to the intake manifold 18 (FIG. 1) through a compressor housing outlet 216 that is in fluid communication therewith. The turbine portion 202 includes the turbine housing 28, a turbine volute 218, turbine outlet 220 and optional sensor housings 222 and 224. The turbine outlet 220 (also referred to as "turbine outlet passage" or as "compressor outlet duct") is integrated into the turbine housing 28 and includes a turbine outlet opening 226 configured to direct exhaust 24 to an exhaust treatment system, such as the catalytic converter 50. The exhaust 24 is received by a turbine inlet 230 and is directed to the turbine wheel 27 (FIG. 1) within the turbine volute 218. The flow of exhaust 24 through the turbine housing 28, including turbine volute 218, drives the rotation of the turbine wheel 27 and, accordingly, compressor wheel 35, thus providing the compressed intake charge 20 for the internal combustion engine 10 (FIG. 1).

Figure 3:
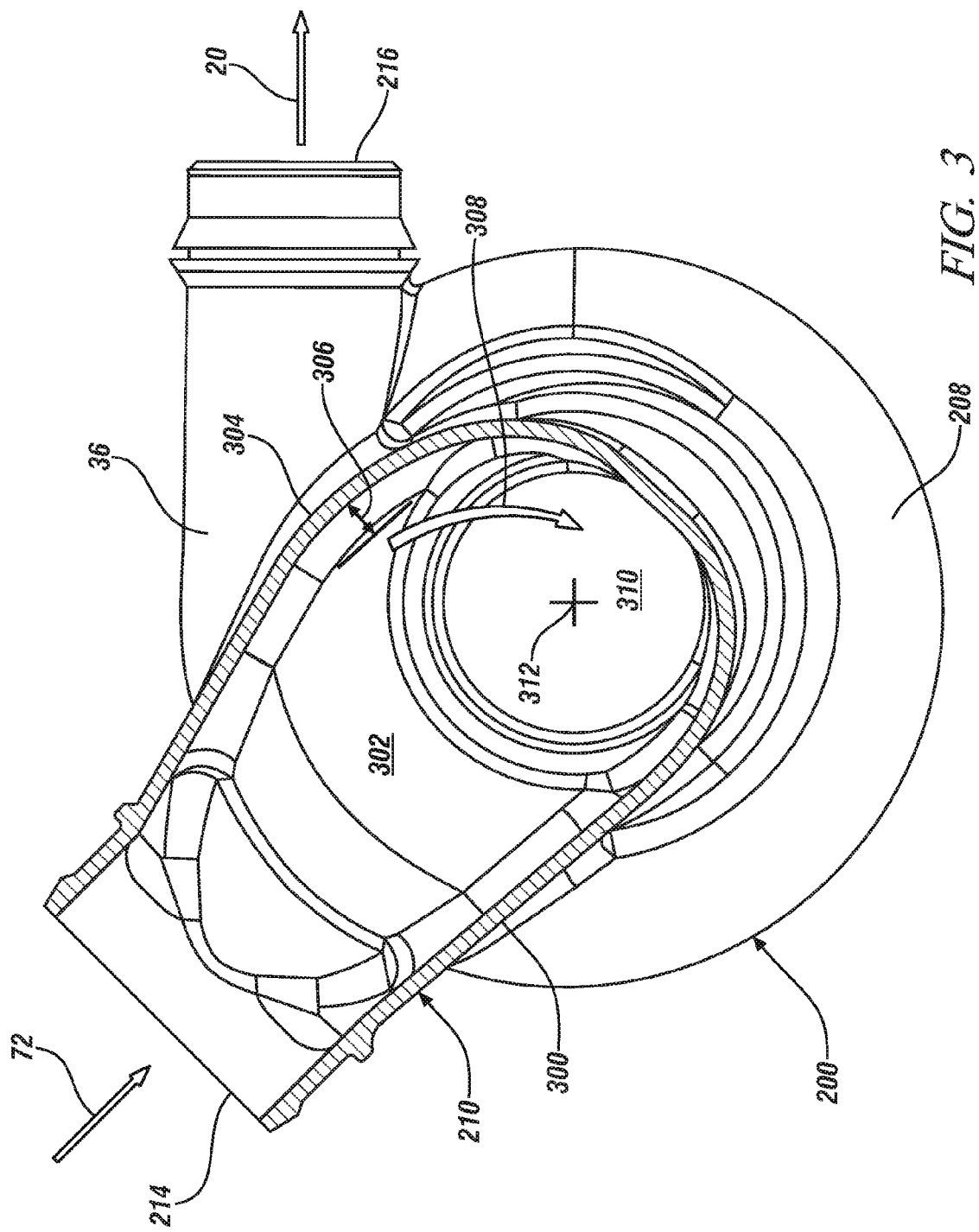
FIG. 3 is a sectional end view of an exemplary compressor portion of the turbocharger.

FIG. 3 is a sectional end view of the compressor portion 200 including the compressor inlet 210 integrated into the compressor housing 36. The compressor inlet 210 comprises an inlet wall 300 that forms the passage to receive the fresh air 72 flowing into the compressor inlet 210. The exemplary compressor inlet 210 and compressor housing 36 share at least a portion of a shared wall 302. The shared wall 302 reduces overall size of the compressor portion 200, such as an axial length of the compressor portion 200. In addition, the compressor inlet 210 comprises an offset portion 304 which is offset a selected distance 306 to induce a swirl 308 component in the fresh air 72 as it flows into the compressor inlet 210. The offset portion 304 is offset by the distance 306, thereby forming a non-concentric cavity and flow path around, and into, a substantially circular volute opening 310. The swirl 308 of air flow formed by offset portion 304 includes a tangential flow component, wherein the tangential direction is with respect to a compressor wheel axis 312 (perpendicular to the figure, also shown in FIG. 4). By integrating the compressor inlet 210 and the compressor housing 36, the overall axial length of the compressor portion 200 is reduced while enabling an improved design and control of the flow path for the fresh air 72 as it enters the compressor volute 208, thereby improving performance of the turbocharger 26. The integrated compressor inlet 210 and compressor housing 36 are formed from a metallic alloy or other suitable durable material, such as a steel alloy cast into a single piece, reducing the number of turbocharger components. The exemplary shared wall 302 includes at least a portion of the wall wherein a first surface of the wall is exposed to the flow path within the compressor inlet 210 and a second surface of the wall is exposed to an inside of the compressor volute 208.

Figure 4:
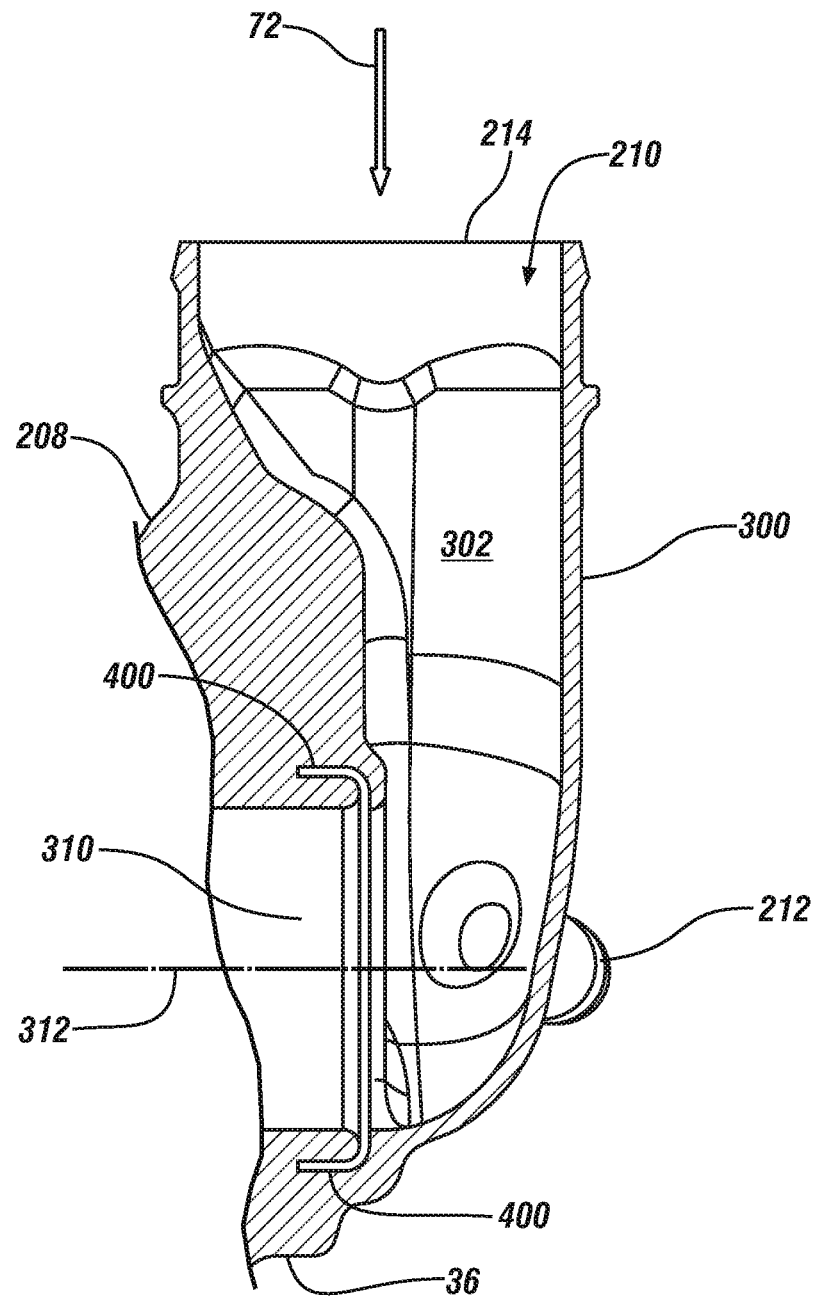
FIG. 4. is a sectional side view of the exemplary compressor portion.

FIG. 4 is a sectional side view of the exemplary compressor portion 200. As depicted, the fresh air 72 is received by the compressor inlet 210 and is directed into the compressor volute 208 via the volute opening 310. The fresh air 72 flows through the passage formed by the inlet wall 300, wherein the flow path is configured to improve the performance of the turbocharger 26 by creating the swirl 308 (FIG. 3) about the compressor wheel axis 312. In an embodiment, the swirl component 308 in the air flow 72 is in the same direction as the compressor wheel 35 (FIG. 1) rotation, thereby increasing the volume of air compressed by the compressor wheel 35, resulting in improved turbocharger 26 performance. The swirl component 308 may be described as including a substantially tangential component with respect to the axis 312. The compressor inlet 210 also includes a recirculation duct 400 configured to allow fluid communication and air flow from the compressor volute 208 into the compressor inlet 210. The exemplary recirculation duct 400 is also integrated into the design of the compressor housing 36, further simplifying the turbocharger 26 assembly. An exemplary compressor portion 200 with the integrated compressor inlet 210 and compressor housing 36 controls the flow path of fresh air 72 to improve turbocharger 26 performance. In one embodiment, compressor efficiency is improved by about 0.5 to about 2.5%. In another embodiment, compressor efficiency is improved by about 1 to about 2%. In yet another embodiment, compressor efficiency is improved by greater than about 1%. Compressor efficiency may be defined as a calculated isentropic compressor temperature out divided by the actual compressor outlet temperature. Actual outlet temperature is typically higher due to frictional losses caused by manipulating the gas through the compressor, such as having to rotate the gas with the compressor wheel.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A method for forced air induction of an internal combustion engine, the method comprising:
   providing a compressor housing fluidly coupled to the internal combustion engine, the compressor housing including a compressor volute portion and a compressor inlet portion fluidly coupled to the compressor volute portion, wherein the compressor volute portion includes an outer wall and the compressor inlet portion includes an inner wall, and wherein a portion of the compressor volute portion outer wall and the compressor inlet portion inner wall together define a passage to fluidly couple the compressor inlet portion and the compressor volute portion;
   directing an air flow into the passage defined by the portion of the compressor volute outer wall and the compressor inlet portion inner wall, wherein the passage creates a swirling air flow component into the compressor volute defined by the compressor volute portion; and
   directing a compressed air flow from the compressor volute to an intake manifold of the internal combustion engine.

2. The method of claim 1, wherein directing the air flow comprises receiving the air flow from an air supply conduit.

3. The method of claim 1, wherein directing the air flow comprises swirling the air flow into the compressor volute.

4. The method of claim 1, wherein providing the compressor housing further comprises providing the compressor housing with an integrally cast compressor volute portion and compressor inlet portion.

5. A compressor housing for a forced induction system of an internal combustion engine, the compressor housing comprising:
   a compressor volute portion defined by a wall comprising an outer surface and an opposed inner surface, the compressor volute wall inner surface defining a compressor volute configured to house a compressor wheel;
   a compressor inlet passage in fluid communication with the compressor volute, the compressor inlet passage comprising an inner surface and an opposed outer surface, wherein a portion of the compressor volute wall outer surface comprises a portion of the compressor inlet passage inner surface; and
   a compressor outlet in fluid communication with the compressor volute, the compressor outlet being configured to direct a compressed gas to an intake manifold of the internal combustion engine.

6. The compressor housing of claim 5, wherein the compressor inlet passage is in fluid communication with an air supply conduit.

7. The compressor housing of claim 5, wherein the compressor inlet passage comprises an offset portion upstream of the compressor wheel to induce a swirl of the air flow into the compressor volute.

8. The compressor housing of claim 7, wherein the offset portion forms a non-concentric cavity.

9. The compressor housing of claim 5, wherein the compressor volute portion is integrally cast with the compressor inlet passage.

10. The compressor housing of claim 9, wherein the compressor housing comprises a cast metal.

11. The compressor housing of claim 5, wherein the compressor inlet passage extends along an axis that is orthogonal to a rotational axis of the compressor wheel.

12. The compressor housing of claim 5, further comprising a recirculation duct fluidly coupled between the compressor volute and the compressor inlet passage.

13. A turbocharger for an internal combustion engine, the turbocharger comprising:
   a turbine housing; and
   a compressor housing comprising:
      a compressor volute portion having an outer surface and an opposed inner surface defining a compressor volute configured to house a compressor wheel;
      a compressor inlet portion integrated with the compressor volute portion, the compressor inlet portion being configured to direct an air flow to the compressor wheel rotatably disposed within the compressor volute, wherein the compressor inlet portion comprises an inner surface, and wherein a portion of the compressor volute portion outer surface and the compressor inlet portion inner surface together define a passage extending therebetween to direct the air flow to the compressor wheel; and
      a compressor outlet in the compressor housing, the compressor outlet configured to direct a compressed air flow from the compressor volute to an intake manifold of the internal combustion engine.

14. The turbocharger of claim 13, wherein the compressor inlet portion is in fluid communication with an air supply conduit.

15. The turbocharger of claim 13, wherein the compressor inlet portion comprises an offset portion configured to swirl the air flow in a rotational direction of the compressor wheel rotation.

16. The turbocharger of claim 13, wherein the compressor housing comprises a cast metal.

* * * * *